United States Patent Office 2,986,250
Patented May 30, 1961

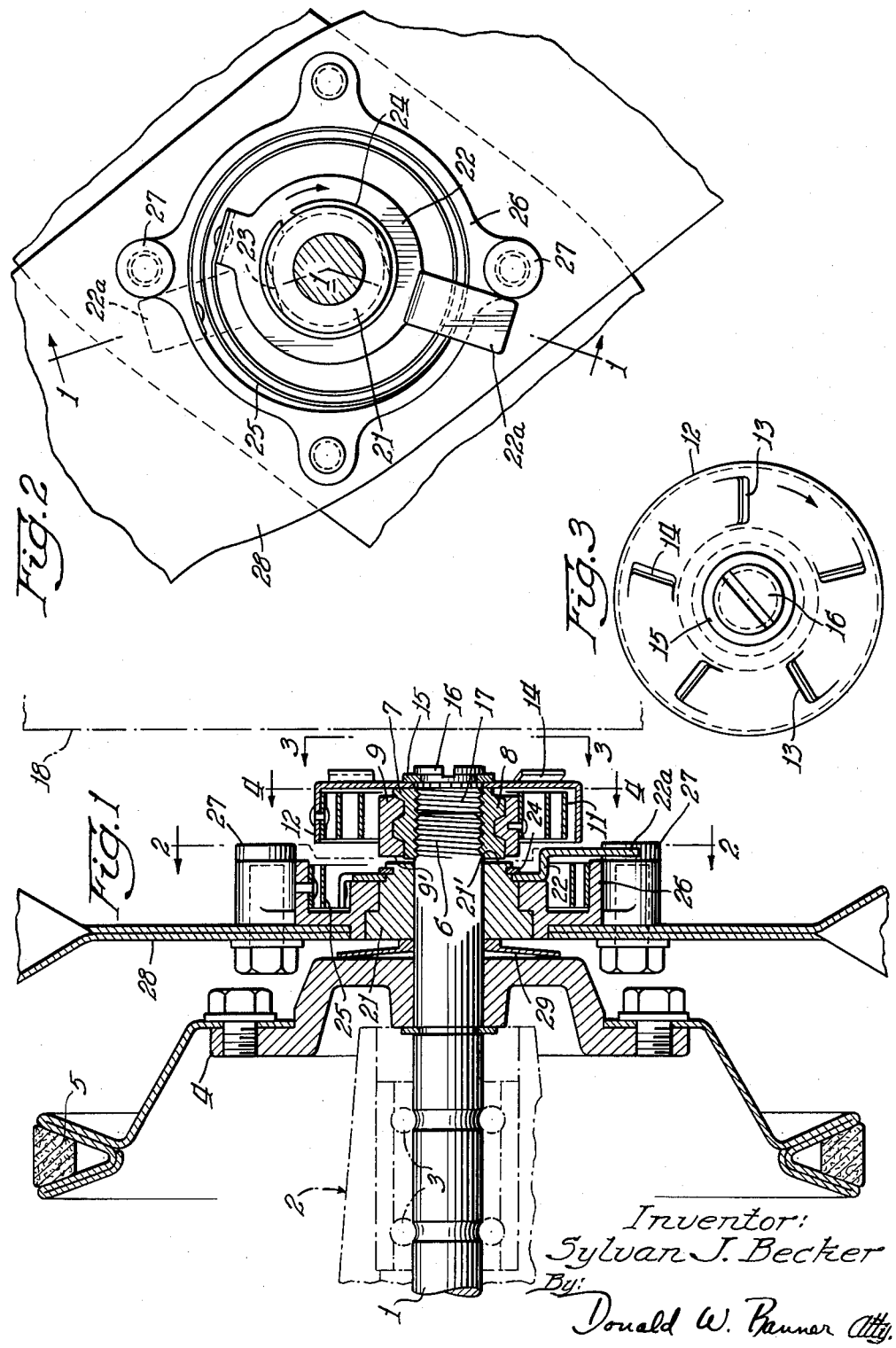

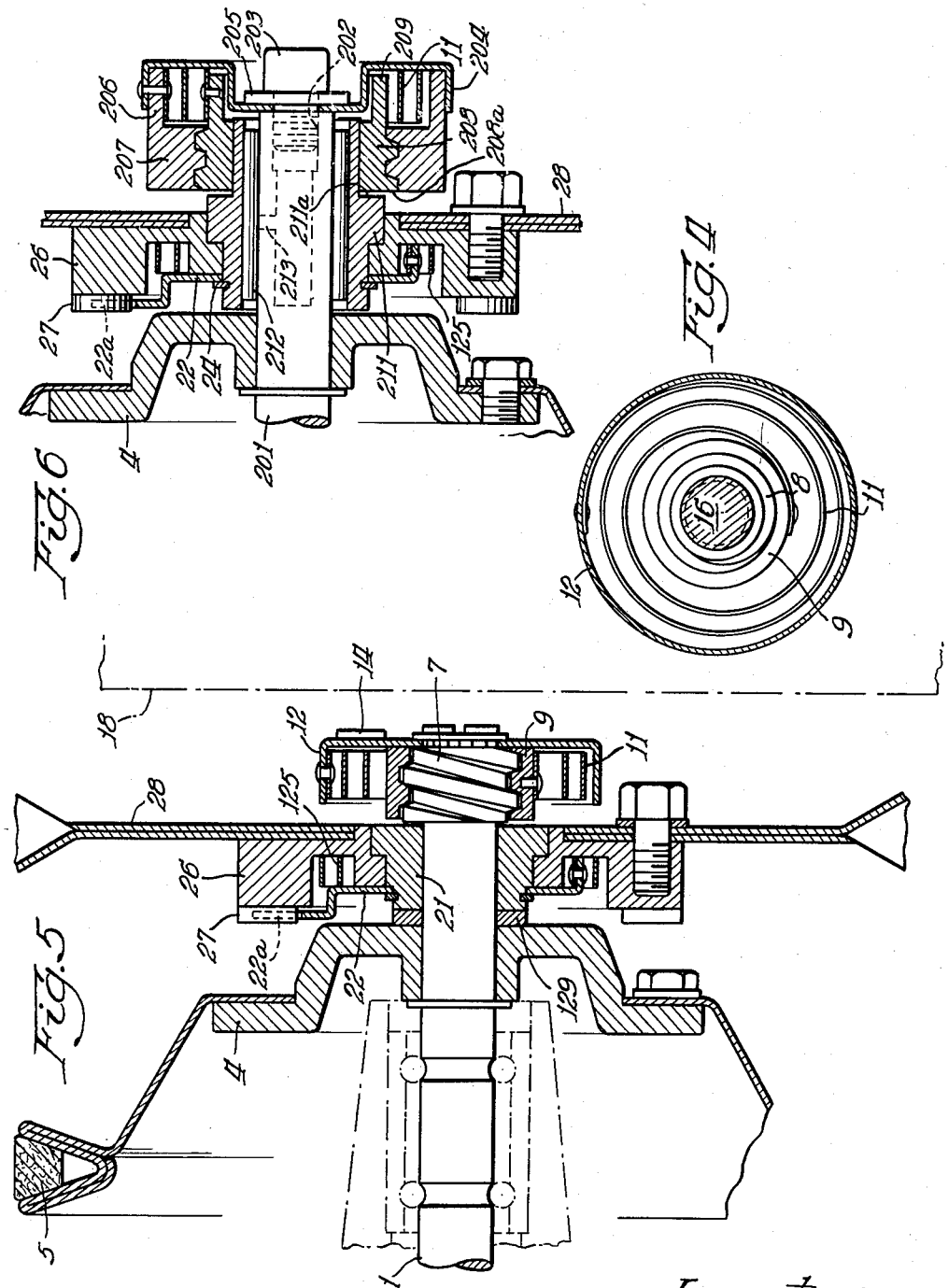

2,986,250

THERMOSTATICALLY CONTROLLED CLUTCH

Sylvan J. Becker, Lombard, Ill., assignor to Borg-Warner Corporation, a corporation of Illinois Filed Jan. 23, 1956, Ser. No. 560,736

17 Claims. (Cl. 192—82)

My present invention relates to an improvement in ambient condition responsive driving means, and more particularly to control means including a thermally responsive clutch adapted to control rotation of a fan associated with an engine.

While it is common practice to employ a radiator cooling fan in conjunction with the internal combustion engine used as the source of power in modern automotive vehicles, it is well recognized that the fan is unnecessary under may—if not most—driving conditions, and that the fan wastes power and fuel under such conditions. Such wasted power could very readily be used either to propel the vehicle or operate useful accessories. Many attempts have been made in the past to provide mechanism by which such a fan in automotive vehicles could be utilized to its maximum advantage when needed but which would render the fan inoperative when unnecessary. Such prior mechanisms, however, were to the best of my knowledge either undependable, excessively expensive, or failed to function as required under all road conditions.

It is therefore one object of the present invention to provide an improved ambient condition responsive driving means selectively operable to connect and disconnect a driven member from its driving mechanism.

Another object is the provision of an improved device in accordance with the preceding object which is simple and dependable, but which may be produced inexpensively and incorporated into modern automotive vehicles with a minimum of modification in the standard forms thereof.

Another object is the provision of a device of improved nature in accordance with the preceding objects in which a fan will operate despite failure in, or breakage of, elements of a thermally responsive mechanism.

Another object is the provision of an improved device in accordance with the preceding objects which employs thermally responsive means subjected to the temperature of the air passing through the radiator or like mechanism and controlling the initiation of operation of a self-locking clutch mechanism.

Another object of the present invention is the provision of an improved device in accordance with the preceding objects in which a bimetallic member is subjected to the temperature of air coming through a radiator, the bimetallic member controlling movement of one element of a self-locking clutch structure which, when energized, mechanically connects the fan to the fan-drive shaft of the vehicle.

Other objects and features of the invention will be readily apparent to those skilled in the art from the specification and appended drawings illustrating certain preferred embodiments in which:

Figure 1 is a partial sectional view along the plane of line 1—1 of Figure 2;

Figure 2 is a view along the plane of line 2—2 of Figure 1;

Figure 3 is a detail view along the plane of line 3—3 of Figure 1;

Figure 4 is a detail view along the plane of line 4—4 of Figure 1;

Figure 5 is a view similar to Figure 1 illustrating a modified form of my invention;

Figure 6 is a view similar to Figure 5 showing another modified form of my invention.

Considering first the form of my invention illustrated in Figures 1 through 4, as best illustrated in Figure 1 there is provided a pump shaft 1 journaled in a suitable housing 2 by means of the bearings 3. The shaft 1 is driven continuously from the engine (not shown) by means of the pulley mechanism 4 rotated continuously by the conventional drive belt 5 and fixedly attached to shaft 1.

The outermost end of the shaft 1 is threaded, as indicated at 6 in Figure 1, and mounts a stud 7 having internal threads cooperating with the threads 6 on the shaft 1. The stud 7 is generally cylindrical in configuration and the exterior thereof is provided with an acme thread as indicated at 8 in Figure 1. Mounted upon this threaded portion 8 is a nut 9 having a rear radial extending face 9' and also having internal complementary threads cooperating with the threaded portion 8 so that rotation of nut 9 effects forward or backward movement thereof with respect to stud 7. In the embodiment of the present invention illustrated in Figure 1, the threaded portion 8, and the complementary threaded portion on nut 9, are provided with three threads per inch which are "left handed." To the external portion of the nut 9—there is attached by suitable means (such as rivets) one end of a spiralled bimetal 11, the opposite end of which is rigidly attached by suitable means (such as rivets) to a cup 12. As best illustrated in Figure 3, the cup 12 is provided with a plurality of windows 13 in circumferential array through the forwardly facing portion thereof, the windows 13 being formed by shearing portions of the cup 12 outwardly to form scoops 14 arranged to force air into the windows 13 upon rotation of the cup 12 in a clockwise direction (in the view of Figure 3). The cup 12 is maintained in the position illustrated in Figure 1 by means of a snap ring 15 disposed in a suitable slot in a stud 16 having an internally projecting threaded portion 17 adapted to cooperate with the internal threads on the stud 7, and these cooperating threads are preferably also "left handed."

In Figure 1 there is illustrated diagrammatically the back wall 18 of the radiator of the automotive vehicle in which the embodiment of the invention is utilized. Air passing inwardly through the back of the radiator contacts the mechanism previously described for a purpose which will hereinatfer appear more fully, this air having been heated by passage through the radiator. As the heated air comes into contact with the bimetal 11, it will obviously affect the condition of that bimetal as is well known to those skilled in the art. For the present it is only essential to notice that the spacing between the radiator and the aforedescribed mechanism is such that the bimetal 11 is subject to the heated air passing through the radiator, and preferably spaced in back of the radiator a distance comparable to that illustrated in Figure 1, or in any event a distance such as to be rendered operative by this heated air. It has been found by construction of devices embodying applicant's invention that the bimetal 11 may be disposed sufficiently close to the radiator so that there is only a temperature difference of between 5 and 10 degrees between the water in the radiator and the temperature of the air when it strikes the bimetal.

Disposed upon shaft 1 for longitudinal and rotational movement thereon is a bearing member 21, of bronze or other anti-friction material, having a forward radially extending face 21'. As best illustrated in Figure 2 the bearing member 21 has a circular aperture centrally located therein through which the shaft 1 extends, the shaft 1 and this circular aperture being substantially the same dimension but permitting the aforementioned longitudinal and rotational movement between the shaft 1 and the bearing member 21. The exterior surface of the member 21 is provided with a plurality of stepped surfaces, as illustrated in Figure 1. On one of these surfaces there is disposed a lever 22, best illustrated in Figure 2, which is keyed to its cooperating surface on the member 21 by means of cooperating flat surfaces 23 whereby the lever 22 is prevented from rotating relative to the member 21. A snap ring 24 is provided in a suitable groove in the bearing member 21 and serves, together with a radially extending surface of the member 21 axially spaced inwardly from the snap ring 24, to hold the lever 22 from axial movement with respect to the bearing member 21. As may be seen in Figures 1 and 2 the lever 22 comprises a central radially extending portion, the opposite ends of which respectively terminate in oppositely directed axially extending portions. From one of these axially extending portions (the lower one in Figure 1) extends a further radially extending portion 22a. Figures 1 and 2 further illustrate that the other of these axially extending portions (the upper one in these figures) is fixedly attached (by means of rivets or the like) to a spiral spring 25 disposed within a suitable recess formed in, and having its opposite end attached to, a fan support member 26. Member 26 is mounted upon the bearing member 21 and, as clearly illustrated in Figure 1, is confined against axially rearward movement by means of a vertical portion of the stepped outer surface of the member 21, and is confined against forward motion relative to the bearing member 21 by means of the lever 22-snap ring 24 arrangement. Although confined against longitudinal motion with respect to the bearing member 21, the fan support member 26 is rotatable relative thereto. A fan 28 of the conventional multibladed type is fixedly attached to support member 26 by means of bolts extending therethrough and into suitably threaded apertures in a plurality of spaced studs 27 formed on member 26.

It will be apparent from the foregoing description that the sub-assembly comprising the bearing member 21 and the fan support member 26 with the fan attached thereto are longitudinally movable along the shaft 1. This sub-assembly, however, is biased forwardly—to the right in Figure 1—by means of a Belleville washer 29 disposed between the pulley 4 and the bearing member 21 for a purpose to be explained.

The operation of the embodiment of the present invention illustrated in Figures 1 through 4 will now be described. When the engine of the vehicle in which this embodiment is disposed is operating, the fan belt 5 will serve to continuously rotate the pulley 4 and the shaft 1. This is conventional construction. The stud 7, the nut 9, the cup 12 and the bimetal 11 will turn continuously with the shaft 1, this direction of rotation being clockwise when viewed from the vehicle front, as indicated by the arrow on Figure 3. As the vehicle moves forwardly, air will pass through the radiator 18 removing heat from the water or other liquid which serves to cool the engine of the vehicle and which is circulated through the radiator to dissipate this heat in conventional fashion. Under normal conditions, the sub-assembly comprising the bearing member 21, the fan support 26 and the fan 28, therefore, will not be rotated with the shaft 1. In distinction, this sub-assembly will "idle" so as to rotate in the same direction as the shaft 1 but at a slower speed, this movement being caused by the bearing drag between the shaft 1 and the bearing member 21, and also because of the fact that the fan blades 28 are disposed such as to cause clockwise direction of rotation of the fan when the air currents caused by forward motion of the vehicle pass the fan blades. This is the condition which will prevail throughout the greater part of operation of the vehicle under normal situations, and it will be seen that under such conditions the fan 28 is not serving to cool the engine, and no horsepower from the engine—or more accurately, only an insignificant amount of horsepower—is employed to drive the fan.

It should be noted that throughout this operation of this device, the scoops 14 of the cup 12 are serving to force air through the windows 13 and effect its passage over the bimetal 11. As water in the radiator increases in temperature, the air passing therethrough will correspondingly increase in temperature. The bimetal 11 is chosen such—both as to its degree of activity and its direction of spiralling—that when this heated air reaches a predetermined degree of temperature, bimetal 11 will effect rotation of nut 9 on the stud 7 in a counterclockwise direction from the view of Figure 4. The nut 9 will therefore be moved rearwardly and, as best illustrated in Figure 1, the rear face 9' thereof will engage the front face 21' of bearing member 21. As previously explained, the bearing member 21 will at this instant be rotating relatively counterclockwise with respect to the nut 9 and the shaft 1 (from the front of the device) which, of course, is the same relative direction of rotation of the nut 9 with respect to the stud 7 as is imparted to the nut 9 by the heated bimetal 11. As a result, the frictional engagement between the bearing member 21 and the nut 9 will cause the nut 9 to continue its rotation in the same direction imparted to it by the bimetal, the net result being a further movement of the nut 9 rearwardly. This transitional movement of the nut 9 is aided by the cooperating threads on the nut 9 and the stud 7 which are of the "self-locking" type. As a result, after the bimetal 11 effects initial engagement between the nut 9 and the bearing member 21, the nut 9 is moved rearwardly very rapidly and the bearing member 21 is forced rearwardly by the nut 9 against the bias of the Belleville washer 29 which is tightly compressed between the pulley 4 and the bearing member 21.

The bearing member 21 is then, in effect, mechanically coupled to the shaft 1 so as to rotate therewith. Inasmuch as the fan support 26 may rotate relatively to the bearing member 21, however, the fan 28 is not immediately brought up to the speed of shaft 1. Rather, the bearing member 21 and the lever 22 attached thereto will move in a clockwise direction with respect to the fan 28. This movement may be seen readily from Figure 2 in which the full line position of the lever 22 illustrates the normal position thereof with respect to the fan support 26. As the bearing member 21 to which the lever 22 is attached is brought up to the speed of the shaft 1, the arm 22a of the lever 22 will pass from the full-line position of Figure 2 to the dotted-line position therein. This relative movement between the lever 22 and the fan support member 26 will, obviously, stress the spring 25 progressively as this relative motion occurs. If the difference between the shaft 1 speed and the fan 28 speed is great, the arm 22a will pass all the way from the full-line position to the dotted-line position of Figure 2 and engage one of the lugs 27 to mechanically drive the fan 28; if the initial difference in speeds between the shaft 1 and the fan 28 is relatively small, the arm 22a may not engage the lug 27 but rather assume some intermediate position between the full and dotted-line positions illustrated in Figure 2, in which case the fan 28 will be driven solely through the spring 25.

It should be noted that with the fan rotating at the speed of the shaft 1, the entire unit is "locked up" and no relative movement between the parts occurs. The fan then operates essentially as does the conventional fan in the present day automotive vehicle.

When the rotative speed of the shaft 1 rapidly decreases, as when the accelerator of the vehicle is released rapidly, the momentum of the fan 28 will cause it to attempt to continue rotation at its former speed so that the fan 28 will be rotating faster than the shaft 1 and the bearing member 21. This relative movement between the fan 28 and the bearing member 21 is aided by the stressed spring 25. As a result, the lugs 27 on the fan support member 26 will be rotated relative to the arm 22a on the lever 22. When this rotation has passed approximately 180 degrees one of the lugs 27 will contact the arm 22a with a smart impact with the result that the lever 22 is rotated in a clockwise direction together with the bearing member 21. Inasmuch as the nut 9 and the bearing member 21 are in frictional engagement at this time, the nut 9 is also moved in a clockwise direction with respect to the stud 7 so that the nut 9 tends to move away from the bearing member 21 and effect its release. If the bimetal 11 at this time is still hot, the nut 9 will immediately be returned to its frictional engagement position with the bearing member 21; when the shaft 1 again overspeeds the fan, as previously described, the fan will once again be "locked up" so as to rotate with the shaft 1.

It should be noted that the bimetal 11 will not have enough strength in and of itself to move the nut 9 away from the bearing member 21 during this "locked up" condition of the device because of the self-locking effect of the frictional engagement between the nut 9 and the bearing member 21. However, if the bimetal is cool and the shaft 1 speed decreases rapidly, when the lugs 27 strike the arm 22a to effect rotation of the bearing member 21 as previously described in the direction to move the nut 9 forwardly, as the nut 9 is moved toward the right along the stud 7 the bimetal 11 can continue this movement of the nut 9 away from the bearing member 21 to the end that the frictional engagement therebetween is broken and not reestablished. As a result, the normal condition of the device as previously described will prevail, and the sub-assembly comprising the bearing member 21, the fan support member 26 and the fan 28 will once again be released from its "locked up" connection with the shaft 1 and will "windmill" and no longer absorb any more than an insignificant amount of horsepower from the engine.

It should be noted that the device of the present invention as illustrated in Figures 1 through 4 will operate in such a manner as to cause the fan to be rotated at all times should the bimetal 11 be broken. More specifically, if the bimetal 11 should be broken, the nut 9 will move longitudinally with respect to the stud 7 to engage the bearing segment 21 and effectively "lock up" the fan mechanism 28 to the shaft 1 whereupon the fan will continuously operate as is the present condition in modern automotive vehicles. Similarly, in the event the spring 25 should accidently be broken, or in the event the Belleville washer 29 should be broken, the device will continue to be operative as previously described except for the fact that the engagement and disengagement of the fan sub-assembly will be more sharply effected.

Discussing now the modified embodiment of the present invention illustrated in Figure 5, it will be seen that the fan 28 has been mounted on this embodiment so as to be adjacent cup 12 as distinguished from its position in Figures 1 through 4 in which it was spaced rearwardly therefrom. In the Figure 5 the parts which are the same as in Figures 1 through 4 have been given the same number as previously employed, the sub-assembly comprising the bearing member 21, the fan support member 26 and the fan, however, being reversed from the position illustrated in Figures 1 through 4. In addition, the spring 25 in Figures 1 through 4 is wound in the opposite direction so as to spiral oppositely, and has been assigned the numeral 125. Furthermore, in Figure 5 the Belleville washer 29 of the embodiment in Figures 1 through 4 has been removed, and replaced by a washer 129 of cast iron or other comparable material. The operation of the device illustrated in Figure 5 is substantially identical with that previously described, as will readily appear to those skilled in the art.

Turning now to the embodiment of the present invention illustrated in Figure 6, the items in that embodiment comparable to those previously described have been given the numbers previously assigned. It will be seen that there is a pulley 4 rigidly mounted to a shaft 201. The front end of the shaft 201 is provided with a threaded aperture 202 adapted to receive the inner threaded end of a nut 203. Disposed between the end of the shaft 201 and the head of the nut 203 is a cup 204 and a washer 205 serving to hold the cup 204 is engagement with the front end of the shaft 201. The cup 204 is substantially comparable to the cup 12 previously described, except for the fact that it has an inwardly directed central portion clearly illustrated in Figure 6. The outer edge of the cup 204 is fixedly connected (by means of rivets or the like) to an axially extending flange 206 of a stud 207 having a central circular aperture provided with acme threads comparable to those illustrated on the nut 9 in Figure 1. Meshing with these threads on stud 207 is a threaded portion of a nut 208 having an axially extending flange 209, to which one end of a bimetal 11 is fixedly attached, and a radially extending rear face 208a. The opposite end of the bimetal 11 is connected to the flange 206 as illustrated in Figure 6. The radially inner portion of the nut 208 is provided with a circular aperture which receives one end of a bearing member 211 of bronze or comparable material, the bearing member 211 having a radially extending forward face 211a being generally circular in cross section and having a central circular aperture extending therethrough. Disposed between the shaft 201 and the bearing member 211 are a plurality of elongated needle bearings 212, suitable lubrication openings being provided in the shaft 201, as indicated at 213, in communication with the opening 202 in shaft 201. Suitable seals for the lubrication are, of course, also provided.

Fixedly mounted upon the bearing member 211 is the lever 22 having the radially extending arm 22a, as previously described, and rotatably mounted upon the bearing member 211 is the fan support member 26, also previously described.

It will be seen that in the normal condition of the device the shaft 201 is constantly rotated and carries with it the cup 204, the stud 207, the nut 208 (which rotates about the bearing member 211) and the bimetal 11. The fan assembly merely "windmills" as previously described. When the temperature of the bimetal 11 increases sufficiently, it effects rotation of the nut 208 with respect to the stud 207 so as to frictionally bring into contact the rear face 208a of the nut 208 and the adjacent, forwardly facing face 211a of bearing member 211. As previously described, as soon as the nut 208 engages the bearing member 211 in this fashion—and similarly to the manner previously described with respect to the engagement with the nut 9 with the bearing member 21 in Figure 1—the direction of rotation is such that the nut 208 forces the bearing member 211 rearwardly into engagement with the pulley 4 so as to effectually connect the bearing member 211 for common rotation with the shaft 201. The lever 22 is therefore rotated so as to bring the arm 22a thereof toward one of the studs 27 on the fan support member 26, this action stressing the spring 125. As previously described, this will effect rotation of the fan 28 at the same speed as the rotation of the shaft 201. When the fan overruns the shaft 201 and the bimetal 11 has sufficiently cooled, as previously described, the lugs 27 will smartly engage the arm 22a to effect rotation of the bearing member 211 in such a direction as to permit the nut 208 to "back off" away from its rearward position and forwardly of the device so that the rear edge 208a thereof is no longer in engagement with the forwardly facing face 211a on the bearing member 211.

It will readily appear to those skilled in the art that the device of the present invention provides for driving of the fan only when it is necessary to do so, and consequently effects a substantial saving in power which has heretofore been wasted when the fan is driven needlessly. In addition, during low temperature periods the engine will reach its operating temperature more rapidly than in conditions in which the fan was continuously driven. It is particularly important to notice that these and other advantageous features are accomplished by mechanisms which requires no substantial changes whatsoever in the present structures utilized in modern automotive vehicles. In addition, the device is so constructed as to be extremely inexpensive in comparison with prior devices, and is furthermore relatively foolproof; even though the bimetal and/or the spring employed should break, the worst that could happen would be the fan would be driven continuously. Furthermore when the device is "locked up" there are no moving parts which would otherwise be subjected to wear and require costly replacement.

It will be seen that the bimetal employed can be given any degree of activity which is found to be necessary or desirable in any particular circumstance so as to effect rotation of the fan at any desired temperature. In addition, the employment of a bimetal and a "self-locking clutch" arrangement in this environment is a distinct improvement over prior devices such as centrifugally responsive mechanisms which oftentimes would disengage the fan when the engine was racing despite a high ambient temperature or low atmospheric pressure which would cause the cooling fluid to boil. Furthermore the present invention is a marked improvement over hydraulically responsive systems which require a plurality of extremely expensive apertures, fluid passages etc. in the engine block and pump housing, together with diaphrams, seals, etc. which render the cost of producing and employing such mechanisms extremely high. In distinction, the present invention is simple, sturdy and relatively inexpensive. It is, furthermore, light in weight, compact, rugged, and additionally is "fail safe" and operates to lock up the fan in the event of failure of the bimetal or other ambient condition responsive mechanism.

Although throughout the foregoing specification the driven member referred to has been a fan, other devices may obviously be driven by the mechanism of the present invention if so desired.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In a control device, the combination comprising rotatable drive means, driven means normally rotatable relative to said drive means, a clutch member movable into and out of engagement with said driven means constructed and arranged to be moved toward said driven means to a first position by said driven means upon initial engagement therewith in which position said drive and driven means rotate together and further constructed and arranged to be moved to a second position in which said driven means are restored to normal condition, and air temperature responsive means constructed and arranged to effect desired engagement of said clutch means and said driven means.

2. In a control device, the combination comprising rotatable drive means, driven means normally rotatable relative to said drive means, clutch means constructed and arranged to connect said drive and driven means as desired comprising a member adapted to be moved by said driven means to a first position in tight frictional engagement with said driven means to effect the connection of said driven means to said drive means and to a second position spaced from said driven means to disconnect said driven means from said drive means, said clutch means and said driven means being constructed and arranged to effect movement of said member toward said first position upon initial engagement between said member and said driven means, and air temperature responsive means constructed and arranged to effect desired engagement of said member and said driven means.

3. The device defined in claim 2 in which said air temperature responsive means are mounted for rotation with said drive means.

4. In a control device, the combination comprising rotatable drive means, driven means normally rotatable relative to said drive means, clutch means constructed and arranged to connect said drive and driven means selectively comprising a screw-threaded member movable to a first position in engagement with said driven means to effect the connection of said driven means to said drive means and to a second position spaced from said driven means to disconnect said driven means from said drive means, said clutch means and said driven means being constructed and arranged to effect movement of said screw-threaded member towards said first position upon initial engagement between said member and said driven means, and thermally responsive means effective to retain said screw threaded member spaced from said driven means during certain thermal conditions so that said driven means remain rotatable relative to said drive means and effective under other thermal conditions to effect desired engagement of said screw-threaded member and said driven means.

5. In a control device, the combination comprising rotatable drive means including means defining a screw-threaded surface carried thereby, driven means normally rotatable relative to said drive means, clutch means constructed and arranged to connect said drive and driven means as desired comprising a member having a screw-threaded surface in engagement with said first mentioned screw-threaded surface movable to a first position in engagement with said driven means to effect the connection of said driven means to said drive means and to a second position spaced from said drive means to disconnect said driven means from said drive means, said clutch means and said driven means being constructed and arranged to effect movement of said member toward said first position upon initial engagement between said member and said driven means, and thermally responsive means effective to retain said screw threaded member spaced from said driven means during certain thermal conditions so that said driven means remain rotatable relative to said drive means and effective under other thermal conditions to effect rotation of said first member about said first mentioned screw-threaded surface and desired longitudinal movement of said member into initial engagement with said driven means.

6. The device defined in claim 5 in which said thermally responsive means comprises a bimetallic member mounted for rotation with said drive means.

7. In a control device, the combination comprising rotatable drive means, driven means co-axially disposed in relation to said drive means and normally rotatable and longitudinally movable relative thereto, means disposed forwardly and rearwardly of said driven means constructed and arranged to clamp said driven means to said drive means comprising a pair of relatively rotatable camming members one of which is adapted to engage said driven means and effect the aforementioned clamping action, and thermally responsive means carried by said drive means effective to prevent relative rotation between said camming members during certain thermal conditions so that said driven means remain rotatable relative to said drive means and effective during other thermal conditions to effect relative rotation between said camming members and effect engagement of said one camming member with said driven means.

8. In a control device, the combination comprising rotatable drive means including means defining a screw-threaded surface carried thereby, driven means co-axially disposed with respect to said drive means and normally rotatable and longitudinally movable relative thereto, means disposed forwardly and rearwardly of said driven means constructed and arranged to effectively clamp said driven means to said drive means comprising a member having a screw-threaded surface in engagement with said first mentioned screw-threaded surface adapted to engage said driven means to effect the aforementioned clamping action, and bimetallic means carried by said drive means effective to retain said screw threaded member spaced from said driven means during certain thermal conditions so that said driven means remain rotatable relative to said drive means and effective under other thermal conditions to effect rotation of said screw-threaded member relative to said screw threaded surface on said drive means in a direction to effect consequent longitudinal movement thereof into engagement with said driven means.

9. In a control system, the combination comprising rotatable drive means having a threaded portion adjacent one end thereof, a pulley fixedly mounted upon said drive means at a point spaced from said threaded portion adapted to effect rotation of said drive means, driven means supported by said drive means between said pulley and threaded surface and normally rotatable with respect to said drive means, an annular stud having internal threads cooperating with said aforementioned threaded portion and including an external threaded surface, a nut threadably engaged with said stud threaded surface and rotatable thereon, said stud threaded surface and said nut surface cooperating therewith being constructed and arranged to effect movement of said nut toward said driven means upon rotation of said nut in a direction opposite to the normal direction of rotation of said drive means, a bimetallic member connected to said nut and adapted to effect rotation thereof in a direction opposite the normal direction of rotation of said drive means to effect longitudinal movement thereof toward said driven means above a predetermined bimetal temperature, an enclosure for said bimetal connected thereto and rotatable with said drive means, said driven means being constructed and arranged to effect further movement of said nut in the same direction as is imparted thereto by said bimetal above said predetermined temperature upon initial engagement of said nut with said driven means whereby said driven means is forced into tight mechanical relation with said pulley and said nut and rotation of said driven means with said drive means is effected.

10. In a fan control system, a combination comprising rotatable drive means, a pulley fixedly mounted upon said drive means at a point spaced from one end thereof adapted to effect rotation of said drive means, an elongated bearing member rotatably supported upon said drive means between said end thereof and said pulley, a generally cup-shaped member attached to said end of said drive means and carried thereby, a stud member having a plurality of internal threads supported by said cup-shaped member, a nut threadably engaged with said internal threads and supported by said bearing member, a bimetal, means attaching one end of said bimetal to said stud and the other end thereof to said nut, driven means supported by said bearing member intermediate said pulley and nut, said engaged threaded surfaces being constructed and arranged to effect movement of said nut toward said bearing member upon rotation of said nut in a direction opposite to the normal direction of rotation of said drive means, said bimetal being constructed and arranged to effect rotation of said nut in a direction opposite to the normal direction of rotation of said drive means to effect longitudinal movement thereof toward said bearing member above a predetermined bimetal temperature, said bearing member being constructed and arranged to effect further movement of said nut in the same direction as is imparted thereto by said bimetal above said predetermined temperature upon initial engagement thereof with said nut means whereby said bearing member is forced into tight mechanical relation with said pulley and said nut and rotation of said bearing member with said drive means is effected, and a fan supported by said bearing member adapted for rotation therewith.

11. In a fan control system, the combination comprising rotatable drive means including means defining a screw-threaded surface carried thereby, driven means normally rotatable relative to said drive means, clutch means constructed and arranged to connect said drive and driven means as desired comprising a member having a screw-threaded surface in engagement with said first mentioned screw-threaded surface movable to a first position in engagement with said driven means to effect the connection of said driven means to said drive means and to a second position spaced from said drive means to disconnect said driven means from said drive means, said cooperating screw-threaded surfaces being of the self locking type, said clutch means and said driven means being constructed and arranged to effect movement of said member toward said first position upon initial engagement between said member and said driven means, thermally responsive means to effect rotation of said member about said first mentioned screw-threaded surface and consequent longitudinal movement of said member into initial engagement with said driven means; said driven means comprising a first member rotatably supported by said drive means, a fan mechanism rotatably supported by said first member, and lost motion means including a resilient member interconnecting said first member and said fan mechanism.

12. The device defined in claim 11 further characterized by the provision of means nonrotatably mounted upon said first member adapted for engagement with said fan mechanism after a predetermined degree of rotation between said fan mechanism and said first member.

13. The device defined in claim 11 in which said fan mechanism comprises a fan support rotatably mounted upon said first member and a multi-bladed fan fixedly attached to said fan support, and in which a lever is provided non-rotatably mounted upon said first member, said fan support having a plurality of spaced projections adapted for engagement with said lever upon predetermined degree of relative rotation between said first member and said fan support.

14. The device defined in claim 13 in which a coiled spring is provided between said lever and said fan support.

15. In a drive device, the combination of rotatable drive means, driven means normally rotatable relative to said drive means, self-energizing clutch means operable for connecting said driven means to said drive means to effect a driving connection therebetween, and means responsive to the temperature of the medium surrounding the drive device effective to retain said self-energizing clutch means against operation during certain thermal conditions of the medium so that said driven means remain rotatable relative to said drive means and further effective under other thermal conditions of the medium to effect operation of said self-energizing clutch means whereby said driven means are connected to said drive means for rotation therewith.

16. The device defined in claim 15 in which said means responsive to the temperature of the medium surrounding the drive device comprise a bimetallic member.

17. The device defined in claim 16 in which said bimetallic member is carried by said drive means.

References Cited in the file of this patent

UNITED STATES PATENTS

| Re. 24,157 | Johnson | May 29, 1956 |
| 936,190 | Tuckfield | Oct. 5, 1909 |
| 1,233,518 | Snyder | July 17, 1917 |
| 1,770,419 | McGrath | July 15, 1930 |
| 1,820,035 | Stokes | Aug. 25, 1931 |
| 1,940,090 | Hetherington | Dec. 19, 1933 |

(Other references on following page)

UNITED STATES PATENTS

| | | |
|---|---|---|
| 2,005,468 | Modine | June 18, 1935 |
| 2,381,567 | Bonham | Aug. 7, 1945 |
| 2,438,161 | Greenlee | Mar. 23, 1948 |
| 2,503,262 | Hall | Apr. 11, 1950 |
| 2,570,515 | Bonham | Oct. 9, 1951 |
| 2,603,420 | Tacchi | July 15, 1952 |
| 2,652,816 | Dodge | Sept. 22, 1953 |
| 2,675,899 | Bonham | Apr. 20, 1954 |
| 2,819,703 | Suttle | Jan. 14, 1958 |
| 2,820,440 | Jacobs | Jan. 21, 1958 |
| 2,840,315 | Heiss | June 24, 1958 |
| 2,879,870 | McColl | Mar. 31, 1959 |
| 2,881,890 | Welch | Apr. 14, 1959 |